(12) United States Patent
Faibish et al.

(10) Patent No.: US 11,210,230 B2
(45) Date of Patent: Dec. 28, 2021

(54) CACHE RETENTION FOR INLINE DEDUPLICATION BASED ON NUMBER OF PHYSICAL BLOCKS WITH COMMON FINGERPRINTS AMONG MULTIPLE CACHE ENTRIES

(71) Applicant: EMC IP Holding Company LLC, Hopkinton, MA (US)

(72) Inventors: Sorin Faibish, Newton, MA (US);
Philip Shilane, Newtown, PA (US);
Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 20 days.

(21) Appl. No.: 16/863,433

(22) Filed: Apr. 30, 2020

(65) Prior Publication Data
US 2021/0342271 A1    Nov. 4, 2021

(51) Int. Cl.
*G06F 12/08* (2016.01)
*G06F 12/0891* (2016.01)
*G06F 12/0864* (2016.01)

(52) U.S. Cl.
CPC ...... *G06F 12/0891* (2013.01); *G06F 12/0864* (2013.01); *G06F 2212/601* (2013.01)

(58) Field of Classification Search
None
See application file for complete search history.

(56) References Cited

U.S. PATENT DOCUMENTS

| | | |
|---|---|---|
| 7,504,969 B2 | 3/2009 | Patterson et al. |
| 7,624,335 B1 | 11/2009 | Maheshwari et al. |
| 7,908,436 B1 * | 3/2011 | Srinivasan ............ G06F 3/0641 711/114 |
| 8,768,895 B2 | 7/2014 | Patterson et al. |
| 8,954,383 B1 | 2/2015 | Vempati et al. |

(Continued)

OTHER PUBLICATIONS

Xu et al., "LIPA: A Learning-based Indexing and Prefetching Approach for Data Deduplication", Conference: 2019 35th Symposium on Mass Storage Systems and Technologies (MSST), May 20-24, 2019.

(Continued)

*Primary Examiner* — Tracy C Chan
(74) *Attorney, Agent, or Firm* — Ryan, Mason & Lewis, LLP

(57) ABSTRACT

Techniques are provided for inline deduplication based on a number of physical blocks having common fingerprints among multiple entries of a buffer cache. One method comprises storing input/output operations in a first cache comprising a plurality of entries each corresponding to a physical storage entity comprising a plurality of physical blocks. A given entry is maintained in the first cache based on a first number of physical blocks of the given entry having a duplicate fingerprint with at least one physical block of another entry in the first cache. A second number can be determined of the physical blocks of each entry having a fingerprint in a second cache, and a first ratio is determined for two entries in the first cache using the second number and the first number. A comparison of the first ratios can be performed to sort and possibly evict entries in the first cache based on the comparison.

20 Claims, 13 Drawing Sheets

BLOCK-BASED TRACKER 600 ($G_i$) OF HASH VALUES OF $PLB_i$
IN GLOBAL FINGERPRINT CACHE

| $PLB_1$ | | X | X | X | X | | X | | X | | $G_1=6$ |
| $PLB_2$ | X | X | | | X | X | X | X | X | X | $G_2=8$ |
| $PLB_3$ | X | X | X | | | X | | X | X | X | $G_3=7$ |

BLOCK-BASED TRACKER 650 ($T_{ij}$) OF COMMON HASH
VALUES AMONG CACHED $PLB_i$ and $PLB_j$          $S_{ij}=T_{ij}/G_j$

| $T_{12}=4$ | | Y | | Y | | Y | | Y | | | $S_{12}=4/8$ |
| $T_{13}=3$ | | Y | Y | | | | | | Y | | $S_{13}=3/7$ |

(56) References Cited

U.S. PATENT DOCUMENTS

| | | | |
|---|---|---|---|
| 9,003,227 | B1 | 4/2015 | Patel et al. |
| 9,104,675 | B1 | 8/2015 | Clark et al. |
| 9,390,116 | B1* | 7/2016 | Li .................... G06F 16/2272 |
| 9,569,357 | B1* | 2/2017 | Shalev ................ G06F 12/0261 |
| 9,778,996 | B1 | 10/2017 | Bono et al. |
| 9,836,243 | B1 | 12/2017 | Chanler et al. |
| 10,210,048 | B2 | 2/2019 | Sancheti |
| 10,474,367 | B1 | 11/2019 | Mallick et al. |
| 2010/0211616 | A1* | 8/2010 | Khandelwal ........ G06F 12/0868 707/812 |
| 2011/0307447 | A1 | 12/2011 | Sabaa et al. |
| 2015/0317326 | A1 | 11/2015 | Bandarupalli et al. |
| 2016/0077746 | A1 | 3/2016 | Muth et al. |
| 2016/0092677 | A1 | 3/2016 | Patel et al. |
| 2017/0277709 | A1 | 9/2017 | Strauss et al. |
| 2018/0285198 | A1 | 10/2018 | Dantkale et al. |
| 2018/0307609 | A1 | 10/2018 | Qiang et al. |
| 2018/0341513 | A1 | 11/2018 | Davies |
| 2019/0042134 | A1* | 2/2019 | Nishizono ............. G06F 3/0641 |
| 2020/0133541 | A1 | 4/2020 | Kleiner et al. |
| 2020/0241793 | A1 | 7/2020 | Shveidel et al. |

OTHER PUBLICATIONS

U.S. Appl. No. 16/260,660, filed Jan. 29, 2019 entitled, "System and Method for Aggregating Metadata Changes in a Storage System."
G. Xu et al., "LIPA: A Learning-based Indexing and Prefetching Approach for Data Deduplication," Conference: 2019 35th Symposium on Mass Storage Systems and Technologies (MSST), May 20-24, 2019, 12 pages.
NVM Express, "NVM Express, Revision 1.3," NVM Express, May 1, 2017, 282 pages.
Commvault, "Storage Policy (Snapshot)" https://documentation.commvault.com/commvault/v11/article?p=60105_1.htm, Sep. 12, 2019, 3 pages.
Oracle, "Managing Snapshots," https://docs.cloud.oracle.com/en-us/iaas/Content/File/Tasks/managingsnapshots.htm, 2020, 3 pages.
U.S. Appl. No. 16/861,986 filed in the name of Vladimir Shveidel et al. on Apr. 29, 2020, and entitled "Lockless Metadata Binary Tree Access."
U.S. Appl. No. 16/862,733 filed in the name of Alexander S. Mathews et al. on Apr. 30, 2020, and entitled "Finding Storage Objects of a Snapshot Group Pointing to a Logical Page in a Logical Address Space of a Storage System."
U.S. Appl. No. 16/862,735 filed in the name of Dixitkumar Vishnubhai Patel et al. on Apr. 30, 2020, and entitled "Mapping Virtual Block Addresses to Portions of a Logical Address Space that Point to the Virtual Block Addresses."
U.S. Appl. No. 16/862,740 filed in the name of Rohit K. Chawla et al. on Apr. 30, 2020, and entitled "Generating Recommendations for Initiating Recovery of a Fault Domain Representing Logical Address Space of a Storage System."
U.S. Appl. No. 16/879,459 filed in the name of Yousheng Liu et al. on May 20, 2020, and entitled "Reusing Overwritten Portion of Write Buffer of a Storage System."
U.S. Appl. No. 16/888,668 filed in the name of Kundan Kumar et al. on May 30, 2020, and entitled "Selective Snapshot Creation Using Source Tagging of Input-Output Operations."
U.S. Appl. No. 16/897,388 filed in the name of Alex Soukhman et al. on Jun. 10, 2020, and entitled "Garbage Collection in a Storage System at Sub-Virtual Block Granularity Level."
U.S. Appl. No. 16/907,560 filed in the name of Vamsi K. Vankamamidi et al. on Jun. 22, 2020, and entitled "Regulating Storage Device Rebuild Rate in a Storage System."
U.S. Appl. No. 16/916,219 filed in the name of Vladimir Kleiner et al. on Jun. 30, 2020, and entitled "Application Execution Path Tracing for Inline Performance Analysis."
U.S. Appl. No. 16/916,621 filed in the name of Dixitkumar Vishnubhai Patel et al. on Jun. 30, 2020, and entitled "Reconstruction of Logical Pages in a Storage System."
U.S. Appl. No. 16/916,763 filed in the name of Dixitkumar Vishnubhai Patel et al. on Jun. 30, 2020, and entitled "Reconstruction of Links between Logical Pages in a Storage System."
U.S. Appl. No. 16/917,090 filed in the name of Dixitkumar Vishnubhai Patel et al. on Jun. 30, 2020, and entitled "Reconstruction of Links to Orphaned Logical Pages in a Storage System."
U.S. Appl. No. 16/938,272 filed in the name of Xiangping Chen et al. on Jul. 24, 2020, and entitled "Efficient Token Management in a Storage System."

* cited by examiner

BLOCK-BASED TRACKER 600 ($G_i$) OF HASH VALUES OF $PLB_i$ IN GLOBAL FINGERPRINT CACHE

| | | | | | | | |
|---|---|---|---|---|---|---|---|
| PLB$_1$ | X | X | X | X | X | X | |
| PLB$_2$ | X | | X | X | X | X | X |
| PLB$_3$ | X | X | | X | X | X | X |

$G_1 = 6$
$G_2 = 8$
$G_3 = 7$

BLOCK-BASED TRACKER 650 ($T_{ij}$) OF COMMON HASH VALUES AMONG CACHED $PLB_i$ and $PLB_j$

| | | | | | | | |
|---|---|---|---|---|---|---|---|
| $T_{12}=4$ | Y | | Y | Y | Y | Y | |
| $T_{13}=3$ | Y | Y | | | Y | | Y |

Input: List of Cached PLBs of Flush Set at Time T(k) Each Containing 2048 4K Blocks; and GFP (Global Fingerprint Cache 120)
Output: Ordered List of Cached PLBs in Buffer Cache 130, *rbuf*.
0: Start Flush Episode
1: For All Host IOs in Buffer Cache 130 at Time T(k) Calculate *hash* = fingerprint(*rbuf*);
2: Select Blocks With Ordered LBA into 2048 Blocks
3: Group Each 2048 Blocks into PLB(i); i=1 to N Number of Flushing Threads
4: /* Ensures Spatial Proximity of Blocks in each PLB */
5: For Each PLB(i), i= 1 to N
6:     For All 2048 Blocks of PLB(i)
7:         Compute murmur *hash(Block)*
8:         Lookup in *GFP* for each *hash(Block)* and Mark 4K Blocks with Duplicates in *GFP*
9:         Compute G(i) refcount of 4K Blocks in PLB(i) with *hash* in *GFP*
10:     End For Blocks
11: End For Each PLB
12: For Each PLB(i), PLB(j) Pair
13:     Find All Duplicate 4K Blocks Between PLB(i) and PLB(j)
14:     T(i, j) = Number of Duplicate Blocks Between PLB(i) and PLB(j)
15:     Compute S(i, j) = T(i, j)/G(j) Ratio of Shared Blocks Between PLB(i), PLB(j) and Blocks in *GFP*
16: End For Each PLB Pair

17: For Each Pair PLB(i), PLB(j)
18:     /* Sorts PLBs in Buffer Cache 130 Using Bubble Sorting */
19:     If S(i, j+1) < S(i, j) Then
20:         Swap PLB(i) with PLB(j) in LRU PLB List
21:     End If
22: End For Each PLB Pair
23: /* All PLBs in Current Flush Episode Now Ordered by S(i, j) */
24: /* PLBs Now Ordered by Temporal Co-Locality in Buffer Cache 130 and by Spatial Order of LBA Within Each PLB */
25: Process Each PLB(i) for Compression and Deduplication
26: Flush All PLB(k), for k = 1 to N
27: Evict PLB(i), for i < W, from Buffer Cache 130
28: /* where W is threshold = f(cache size, core count) */
29: Store PLB(i) with i > W in Buffer Cache 130
30: Advance Pointer of PLBs to N+1
31: Select Next N PLBs in Next Flush List
32: /* Inverse LRU List; Bottom PLBs Kept in Buffer Cache 130 */
33: Select Next Group of N PLBs to Flush
34: End Flush Episode Processing

FIG. 7B

Input: List of Cached PLBs Already Flushed at Time T(k) Each Containing 2048 4K Blocks
Output: Sorted List of PLBs Resident in Buffer Cache 130 After Flush and PLBs Loaded into Buffer Cache 130 from Disk, *cbuf*.

0: to 16: Same as FIG. 7A
17': /* Keeps PLBs in Buffer Cache 130 Longer if Blocks are Frequently Repeated */
18': /* Evicts PLBs Cached in Buffer Cache 130 For Too Long and Replaces Evicted PLBs with PLBs from Disk */
19': For Each PLB(*l*), PLB(m) Pair in Buffer Cache 130
20':   Compute U(*l*) = S(*l*, m)/S(*l*, m+1)
21':   Compute SF(*l*) = (1-U(*l*)) * G(*l*) + U(*l*)*S(*l*, m)
22':   Compute SF(*l*+1) = (1-U(*l*+1))*G(*l*+1) + U(*l*)*S(*l*+1, m)
23':   /* Teaches Buffer Cache 130 to Replace Old PLBs with PLBs Read From Disk */
24':   If SF(*l*, m+1) < SF(*l*, m) Then
25':     Swap PLB(*l*) with PLB(m) in LRU of Cached PLBs in Buffer Cache 130
26':   End If
27': End For Each PLB Pair
28': For All PLB(i), PLB(j) Pairs
29':   /* Allows Old PLBs Cached Too Long to be Replaced by New PLBs Loaded From Disk */
30':   Replace S(i, j) with SF(i)
31': End For All PLB Pairs
17': to 34: Same as FIG. 7B

FIG. 8

CACHE RETENTION FOR INLINE DEDUPLICATION BASED ON NUMBER OF PHYSICAL BLOCKS WITH COMMON FINGERPRINTS AMONG MULTIPLE CACHE ENTRIES

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input/output (I/O) operation requests for delivery to the storage systems. Storage controllers of the storage systems service such I/O operation requests. Some storage systems use a logical address space, where logical page addresses in the logical address space map to physical page addresses on storage devices of the storage systems. The use of a logical address space facilitates various functionality, including implementation of deduplication in order to ensure that the same data is not repeatedly stored in a duplicative manner that consumes excessive storage capacity.

SUMMARY

Illustrative embodiments of the present disclosure provide techniques for inline deduplication based on a number of physical blocks having common fingerprints among multiple entries of a buffer cache.

In one embodiment, a method comprises storing I/O operations in a first cache associated with a storage system, wherein the first cache comprises a plurality of entries, wherein each entry in the first cache corresponds to a physical storage entity comprising a plurality of physical blocks; and maintaining a given entry in the first cache based at least in part on a first number of physical blocks of the given entry having a substantially duplicate fingerprint, using one or more duplicate fingerprint criteria, with a fingerprint of at least one physical block of another entry in the first cache.

In some embodiments, a second number is determined of the physical blocks of each entry in the first cache having a fingerprint in a second cache, and a first ratio is determined for two entries in the first cache based at least in part on the second number and the first number. Entries in the first cache can be sorted based on the first ratios for the entries. One or more entries can be evicted from the sorted first cache using an eviction policy.

These and other illustrative embodiments include, without limitation, methods, apparatus, networks, systems and processor-readable storage media.

BRIEF DESCRIPTION OF THE DRAWINGS

FIG. 6 illustrates block-based trackers of various hash values for physical large blocks stored in the buffer cache of FIG. 1 in one illustrative embodiment.

FIGS. 7A and 7B illustrate exemplary pseudo code for an exemplary process for maintaining the buffer cache of FIG. 1 in at least some illustrative embodiments.

FIG. 8 illustrates exemplary pseudo code for an alternate process for maintaining the buffer cache of FIG. 1 in at least some illustrative embodiments.

DETAILED DESCRIPTION

Figure 1:
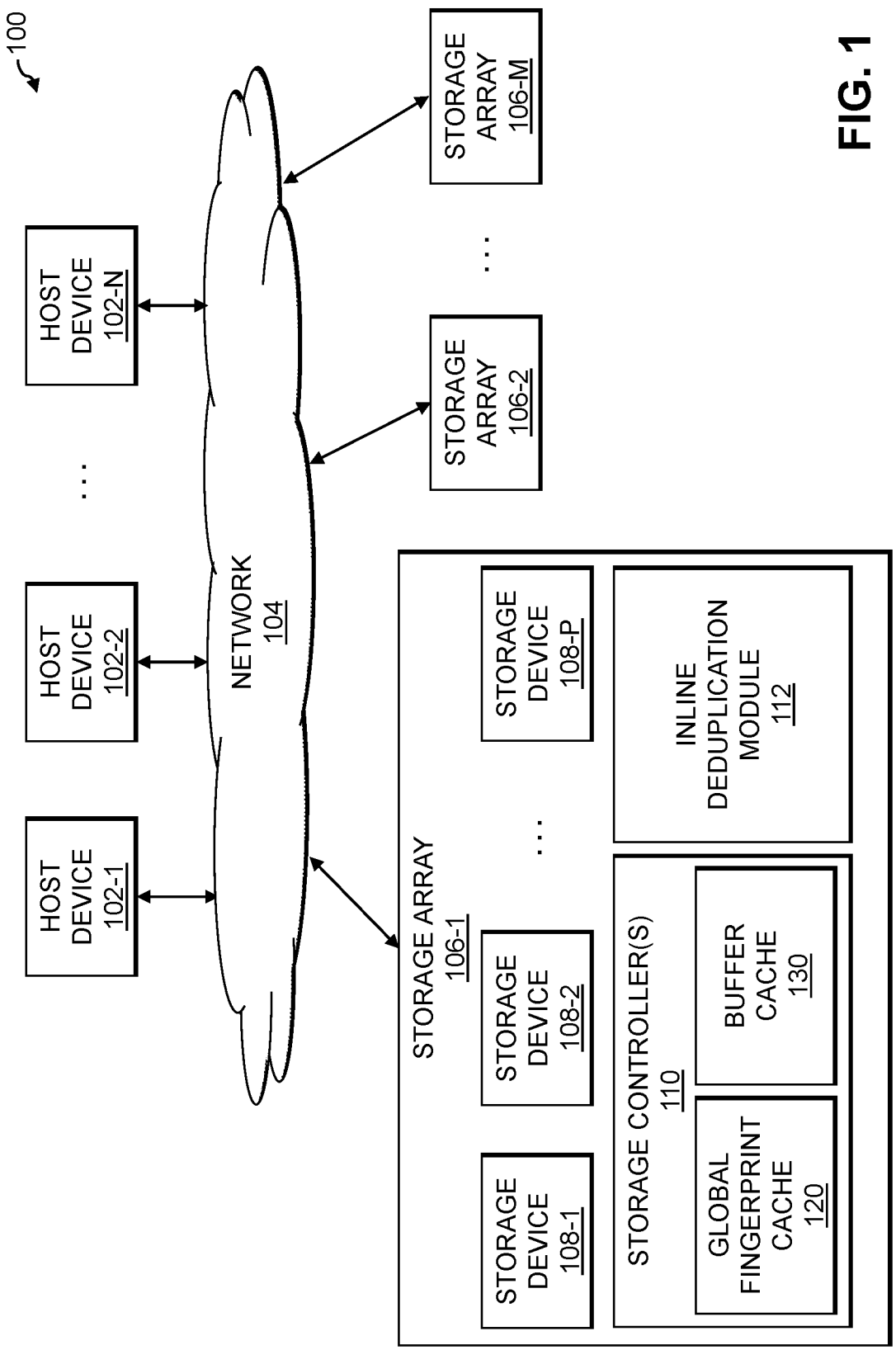
FIG. 1 is a block diagram of an information processing system including a storage array configured to maintain a cache for inline deduplication based on a number of physical blocks with common fingerprints among multiple cache entries in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Many storage systems employ deduplication and compression to reduce the amount of data written to the storage arrays. In most of the cases, the data reduction is done in the memory of the array and then stored on disk (or other storage) using a minimal size. The data reduction is often done inline before the data is flushed (e.g., stored to disk) to reduce the size of the data that will be stored. In order to perform deduplication, for example, the storage array applies a hash function (or another fingerprint) to the data blocks (such as 4K (kilobytes) or 8K data blocks) that are stored in the memory of the storage array. For example, the hash function could be an SHA-1 representation of the blocks using 20 bytes. When the data sets written to the storage array are in the petabytes (PB) range, in order to keep the hash values in memory, there is a need for many terabytes (TB) of cache memory. Existing data reduction solutions try to balance performance with the data reduction by using compute resources at the expense of storage space used on the backend storage to store the data.

Log-structured storage arrays, for example, use the cache to organize the data in a structured manner and to perform deduplication of the data in the cache before the data is written to the backend storage. The data can be organized into blocks, for example, using containers, such as 2 MB (megabyte) containers (often referred to as physical large blocks (PLBs)) that are organized in memory and then deduplication and compression techniques are applied before the data is written to the backend storage as a unit. In general, at any given time, there are n such PLBs in memory before being written to the backend storage. Deduplication may be performed using a key-value store of hash values and the hash values of 2048 4k blocks in each PLB (for example) are looked up in a hash database and the corresponding metadata is updated to point to the data blocks that are duplicates of the blocks with hash values already in the key-value store.

When a hash of a 4K block in a cached PLB is found, the block duplicate is read from the disk and a byte compare is performed with the 4K block in the cache. When the hash was not found in the global hash database there is no need to do a byte compare. One or more aspects of the disclosure recognize that when the same hash value is found in two different PLBs that are at the same time in the cache, a byte compare can be performed without the need to read the block from the backend storage. In this manner, the time co-locality can be leveraged to reduce the need to read the block of data from the backend storage to perform the byte comparison, as the blocks have a high probability of still being in the buffer cache.

In one or more embodiments, a cache retention policy is provided for inline deduplication based on a number of physical blocks with common fingerprints among multiple cache entries. In at least some embodiments, PLBs that have a larger number of hash values in the global hash database are kept in the buffer cache longer. A forgetting factor may be used that is based on a spatial co-locality of the PLB blocks applied to the PLBs that are in the cache at a certain time based on temporal co-locality, as discussed further below. Thus, the caching can be based on temporal co-locality in the cache and the learning may be based on spatial co-locality. In this manner, PLBs with a higher number of duplicate blocks are kept in memory longer (for example, using least recently used (LRU) techniques), and the forgetting factor is updated based on the blocks that are common to multiple PLBs in the cache.

Likewise, when different applications are used at different times with a significant amount of time between the same application writing data to the storage array, say days apart, the hash values of new duplicate blocks in the new data may still be found in one or more hash (fingerprint) databases. Such spatial co-locality indicates that the data blocks may not be in the buffer cache at a given time but the hash values of such data blocks may still be in the cache database. Using machine learning, a policy can be defined that will keep PLBs that have a larger number of duplicate data blocks in the cache longer than blocks with a smaller number of duplicate data blocks. Supervised learning techniques are used in at least some embodiments to decide to retain those PLB containers in the cache for a longer time that have a larger number of duplicate data blocks between the PLBs that are currently in the buffer cache. A ratio is used in some embodiments between the number of duplicates from cached PLBs to the number of duplicates from the global hash database. The ratio can be used as a forgetting factor, in some embodiments, to reorder (e.g., sort) the PLBs in a queue as a reversed LRU (least recently used) and reordering the position of the PLBs in the LRU according to the forgetting factor, using a higher weight for PLBs that have temporal co-locality in the buffer cache.

FIG. 1 shows an information processing system 100 configured in accordance with an illustrative embodiment. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108-1, 108-2, . . . 108-P (collectively, storage devices 108) each storing data utilized by one or more applications running on the host devices 102. The storage devices 108 are illustratively arranged in one or more storage pools. The storage array 106-1 also comprises one or more storage controllers 110 that facilitate I/O processing for the storage devices 108. As shown in FIG. 1, each exemplary storage controller 110 comprises a global fingerprint cache 120 and a buffer cache 130 (for example, in the memory of each storage controller 110). In some embodiments, the global fingerprint cache 120 is implemented as a key-value store that stores fingerprints (e.g., hash values) of each block stored by the storage array 106 (for example, for a storage array 106 with a capacity of 100 TB (terabytes) that uses a hash of 24 bytes, the global fingerprint cache 120 will use 600 GB (gigabytes) of storage, as discussed further below).

The term "fingerprint" as used herein is intended to be broadly construed, so as to encompass, for example, hash values and other types of values that map a given data item to a shorter bit string that identifies and/or represents the original data item. For example, a murmur hash is a non-cryptographic hash function used for a general hash-based lookup. In a deduplication implementation, for example, a murmur hash is used as a fingerprint to identify a candidate duplicate data item, and the duplication is then confirmed by reading the data item and performing a byte comparison with the data item in a cache.

The storage array 106-1 and its associated storage devices 108 are an example of what is more generally referred to herein as a "storage system." This storage system in the present embodiment is shared by the host devices 102, and may therefore also referred to as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given I/O operation as that term is broadly used herein illustratively comprises one or more such commands. References herein to terms such as "input-output" and "I/O" should be understood to refer to input and/or output operations. Thus, an I/O operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement I/O operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

The storage array 106-1 in the present embodiment may comprise additional components not explicitly shown in the figure, such as a response time control module and I/O operation priority queues, illustratively configured to make use of the above-described persistent memory. For example, the response time control module may be used to implement storage array-based adjustments in response time for particular I/O operations based at least in part on service level objective (SLO) information stored by the storage array 106-1 in its persistent memory. The response time control module is assumed to operate in conjunction with the above-noted I/O operation priority queues.

The storage array 106-1 illustratively utilizes its I/O operation priority queues to provide different levels of performance for I/O operations. For example, the I/O operation priority queues may have respective different priority levels. The storage array 106-1 may be configured to provide different priority levels for different ones of the I/O operations by assigning different ones of the I/O operations to different ones of the I/O operation priority queues. The I/O operation priority queues are illustratively associated with respective SLOs for processing of I/O operations in the storage array 106-1.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 106.

Numerous other distributed implementations of the host devices 102 and/or the storage array 106 are possible. Accordingly, the storage arrays 106 can also be implemented in a distributed manner across multiple data centers.

Additional examples of processing platforms utilized to implement portions of the system 100 in illustrative embodiments will be described in more detail below in conjunction with FIGS. 9 and 10.

The storage array 106-1 implements an inline deduplication module 112. The inline deduplication module 112, in at least some embodiments, is configured to implement the cache retention techniques disclosed herein for inline deduplication based on a number of physical blocks with common fingerprints among multiple cache entries. Although not explicitly shown in FIG. 1 for clarity of illustration, it is assumed in some embodiments that other ones of the storage arrays 106-2 through 106-M implement respective additional instances of the inline deduplication module 112, as well as respective sets of storage devices and storage controllers in a manner similar to that described herein with respect to storage array 106-1. Further, although shown in FIG. 1 as being external to the storage controllers 110 of storage array 106-1, in other embodiments the inline deduplication module 112 may be implemented at least partially within one or more of the storage controllers 110. For example, at least one of the storage controllers 110 may be implemented as a virtual storage controller running on an embedded hypervisor of the storage array 106-1. The inline deduplication module 112 may be part of such a virtual storage controller, or may be run separate from the virtual storage controller on such an embedded hypervisor. Various other arrangements are possible, including where at least a portion of the functionality of the inline deduplication module 112 is implemented external to the storage array 106-1 (e.g., on one or more of the host devices 102, on a separate server, on a cloud computing infrastructure, etc.).

At least portions of the functionality of the inline deduplication module 112 may be implemented at least in part in the form of software that is stored in memory and executed by a processor.

It is to be understood that the particular set of elements shown in FIG. 1 for maintaining a cache for inline deduplication based on a number of physical blocks with common fingerprints among multiple cache entries is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process 200 for maintaining a cache for inline deduplication based on a number of physical blocks with common fingerprints among multiple cache entries will now be described in more detail with reference to the flow diagram of FIG. 2. It is to be understood that this particular process 200 is only an example, and that additional or alternative processes for maintaining a cache for inline deduplication based on a number of physical blocks with common fingerprints among multiple cache entries may be used in other embodiments.

Figure 2:
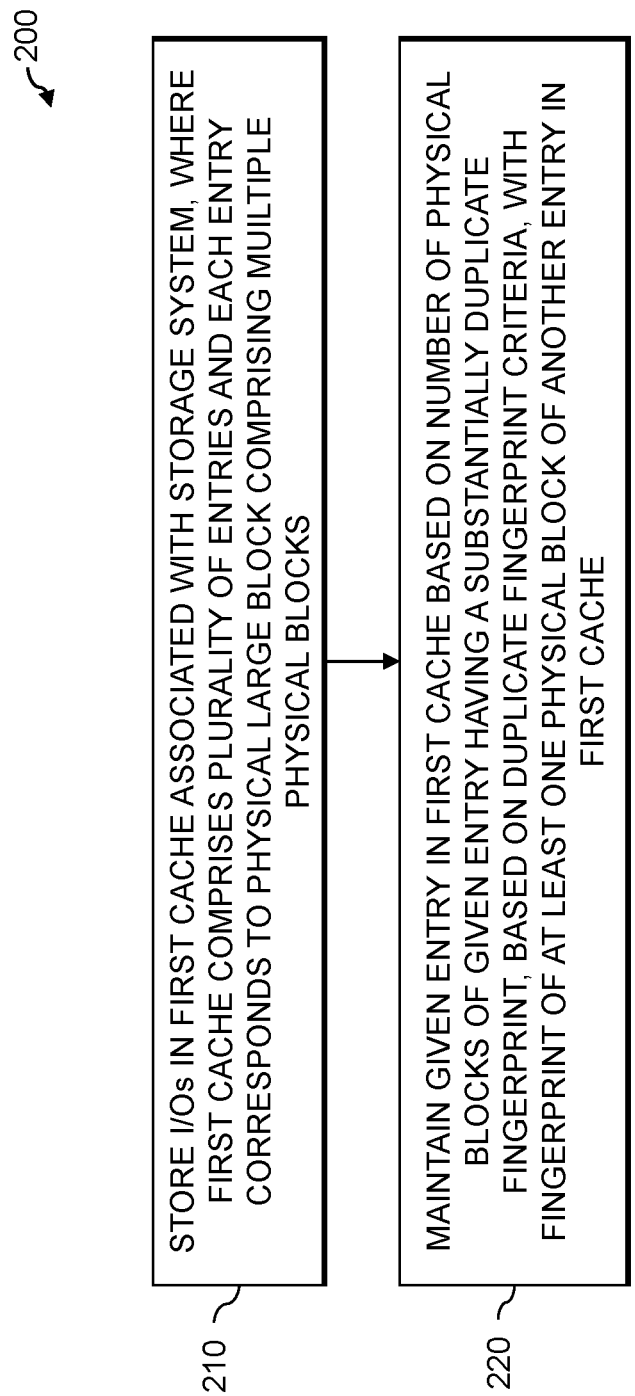
FIG. 2 is a flow diagram of an exemplary process for cache retention for inline deduplication based on a number of physical blocks with common fingerprints among multiple cache entries in an illustrative embodiment.

In the embodiment of FIG. 2, the process 200 includes steps 210 and 220. These steps are assumed to be performed by the storage array 106-1 utilizing the inline deduplication module 112. During step 210, I/O operations are stored in a first cache (e.g., the buffer cache 130) associated with a storage system. In at least some embodiments, the first cache comprises a plurality of entries, where each entry in the first cache corresponds to a physical storage entity (e.g., a physical large block, discussed below) comprising a plurality of physical blocks.

Thereafter, during step 220, a given entry is maintained in the first cache based on a first number of physical blocks of the given entry having a substantially duplicate fingerprint, based on one or more duplicate fingerprint criteria, discussed further below, with a fingerprint of at least one physical block of another entry in the first cache. In some embodiments, a fingerprint of a given physical block comprises a hash function that is applied to data associated with the given physical block.

Figure 3:
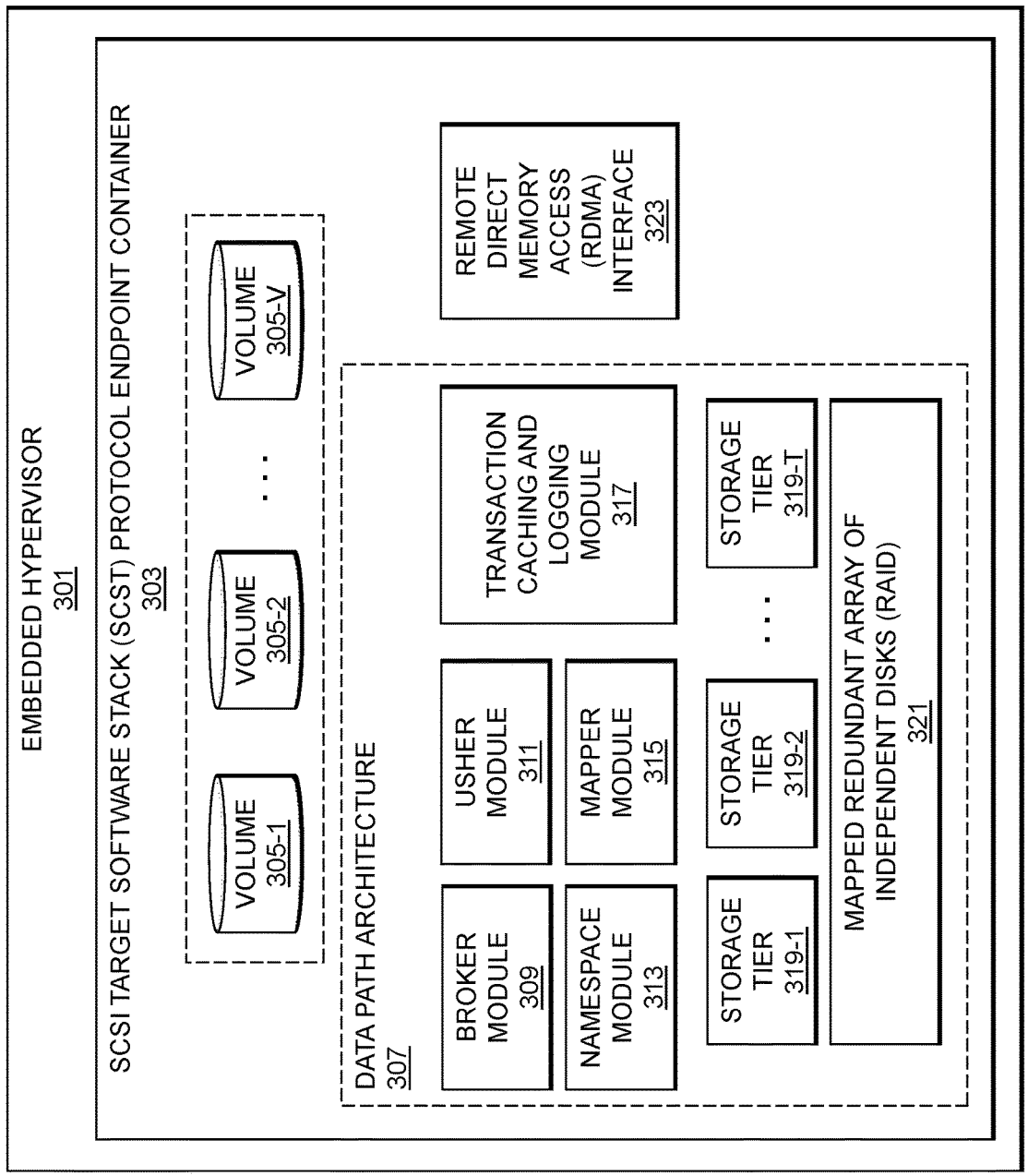
FIG. 3 is a block diagram of an embedded hypervisor implementing a data path architecture in an illustrative embodiment.

FIG. 3 shows a view of a data path architecture 307 for an I/O stack of a storage array (e.g., storage array 106-1). The data path architecture 307 is assumed to be implemented on an embedded hypervisor 301 (e.g., a VMware ESXi™ hypervisor) that runs a base container 303 providing an SCSI target software stack (SCST) protocol endpoint. The embedded hypervisor 301 is an example of a "virtual" storage controller of a storage system (e.g., a virtual one of the storage controllers 110 in storage array 106-1). The SCST protocol endpoint container 303 includes a set of volumes 305-1, 305-2, . . . 305-V (collectively, volumes 305) and the data path architecture 307. The data path architecture 307 includes a broker module 309, usher module 311, namespace module 313, mapper module 315, and a transaction caching and logging module 317. The data path architecture 307 also includes a set of storage tiers 319-1, 319-2, . . . 319-T (collectively, storage tiers 319) and a mapped redundant array of independent disks (RAID) 321. The transaction caching and logging module 317 is configured to utilize remote direct memory access (RDMA) interface 323 as described in further detail below.

The broker module 309 is configured to facilitate communication amongst the various other modules of the data path architecture 307. In some embodiments, the data path architecture 307 implements a layered services model (e.g., for copy engines, replication, migration, etc.). The usher module 311 is configured to implement I/O request queues, including priority share-based scheduling and Quality of Service (QoS) for I/O requests in such queues. The namespace module 313 is configured to implement active/active "thin" volumes and maintain volume attributes. The namespace module 313 is also configured to implement a key-value (K-V) store and directories. The mapper module 315 is configured to implement a thin mapping layer using log-structured writes, with inline compression, deduplication and pattern matching functionality. The mapper module 315 is also configured to implement functionality for snapshotting and determining snapshot differentials, for performing space accounting, and for file system checking (e.g., using a tool such as a Linux file system consistency check (FSCK) tool). The transaction caching and logging module 317 is configured to implement transactions for the active/active volumes, to perform distributed locking, and to implement read/write-back and write-ahead logs. The transaction caching and logging module 317 may comprise two instances, one for data and one for metadata. The mapped RAID 321 is configured to implement distributed virtual striping (e.g., using 4+1 and 8+1 RAID5 implementations) and to provide thin rebuild and distributed sparing. The mapped RAID 321 may support various native block sizes (e.g., 512 bytes (B), 4096B or 4 kilobytes (KB), etc.).

In some embodiments, the usher module 311 implements a data plane polling model. From the producer side (e.g., of the SCST protocol endpoint), requests are submitted using per-core threads. Polling threads pull new I/O requests to user space. The polling threads may execute when associated data plane threads are idle. Load balancing, affinity and QoS (e.g., share-based scheduling and traffic shaping) features may be provided.

The namespace module 313, as described above, is configured to create and expose thin block volumes, and provides functionality for volume management and attributes as well as space management and accounting. The namespace module 313 enables or provides a namespace layer that utilizes a block interface with file-like semantics. In the namespace layer, volumes (e.g., volumes 305) are bound to block protocol endpoints (e.g., PE LUNs). The mapper module 315 enables or provides a mapping layer, which exposes a single contiguous thin address space to the namespace layer. The namespace layer consumes the logical address space provided by the mapper layer.

The namespace layer may use a format that includes a "super block" created by an internal format and anchored at a logical block address (LBA) of 0. The super block identifies locations of allocations, an inode (index node) table, and a "root" directory. The allocations provide references to extent allocators, used to manage free space, as well as to inodes. The extent allocators may use a binary buddy system, and enable efficient reclaim and defragmenting functionality. In some embodiments, the minimum allocation size is 8 MB, and the minimum allocation size for virtual volumes (VVols) such as volumes 305 is 2 GB. The volume allocation aligns to the "mid" level of the mapper as described in further detail below.

The inode allocators provide references to an inode table, which in some embodiments is scalable to millions of inodes and is organized as a free list. An inode may include various content, such as an object type (e.g., file, directory), family universally unique identifier (UUID), inode number and generation, link count, unique identifier (UID) owner, global identifier (GID) owner, object extent location, create and other timestamps, parent inode number, parent directory cookie, etc. The root inode references a root directory object that contains a list of filenames and inodes, while additional inodes contain volume data (e.g., by allocating a data extent and inode, and adding the volume name and inode to the root directory). Multiple volume data extents may be created. Object handles may be used by the usher module 311 to submit I/O thru handles (e.g., inodes) to avoid unnecessary name lookup.

The transaction caching and logging module 317 may implement a transaction cache and a transaction log. The transaction cache, in some embodiments, is transactional and provides read and write cache buffering with two instances (e.g., data and metadata). The transaction cache, in at least some embodiments, stores data and metadata in memory, removes such data and metadata from memory and provides local and distributed peer-to-peer (P2P) sticky locks. In some embodiments, an active/active configuration, an ALUA configuration, or combination thereof may be used. For example, the data path architecture 307 may be active/active, while SCST supports both active/active and ALUA. The transaction log provides write-ahead transaction logs, such as by using low latency mirrored NVRAMs for persistence. The transaction cache, for example, may be implemented in-memory (e.g., DRAM), while the transaction log is persisted to NVRAM.

The mapper module 315, as noted above, may provide a mapping layer of the data path architecture 307. The mapping layer may provide various functionality, such as enabling patterns, deduplication, compression, and mapping. Pattern functionality includes storing patterns (e.g., rather than pointer+data), and re-generates data on read, and may include 4 KB of 0s or 1s (where, in this context, 0s are different than unmapped space). Deduplication functionality includes the use of a fingerprint cache and read and compare validation. Compression functionality may include the use of various types of compression algorithms, including QAT hardware offload, LZ Deflate, Dynamic Huffman, etc. In some embodiments, data is compressed and packed into 2 MB data stripes. The mapping functionality includes a thin map, implemented in some embodiments as a 512-way B-tree structure described in further detail below. The thin map in such embodiments is keyed by LBA (e.g., rather than using content-addressable storage (CAS)), and provides snapshot and differential capability along with copy-by-reference. The mapper module 315 may utilize the storage tiers 319 (e.g., using flash tiers, storage-class memory (SCM) tiers, NVRAM tiers, etc.).

Figure 4A:
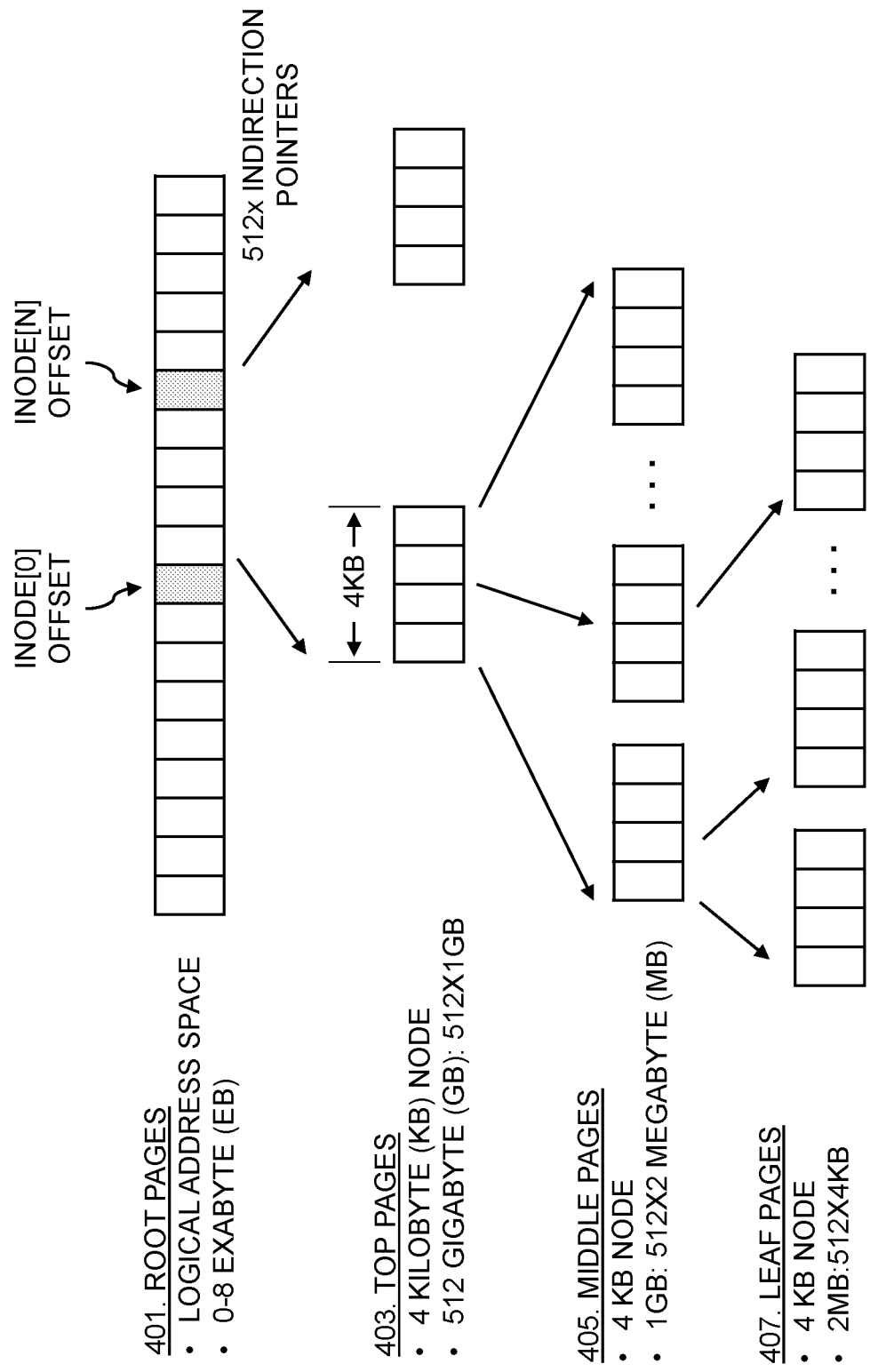
FIGS. 4A and 4B illustrate a tree structure for a logical address space in an illustrative embodiment.
Figure 4B:
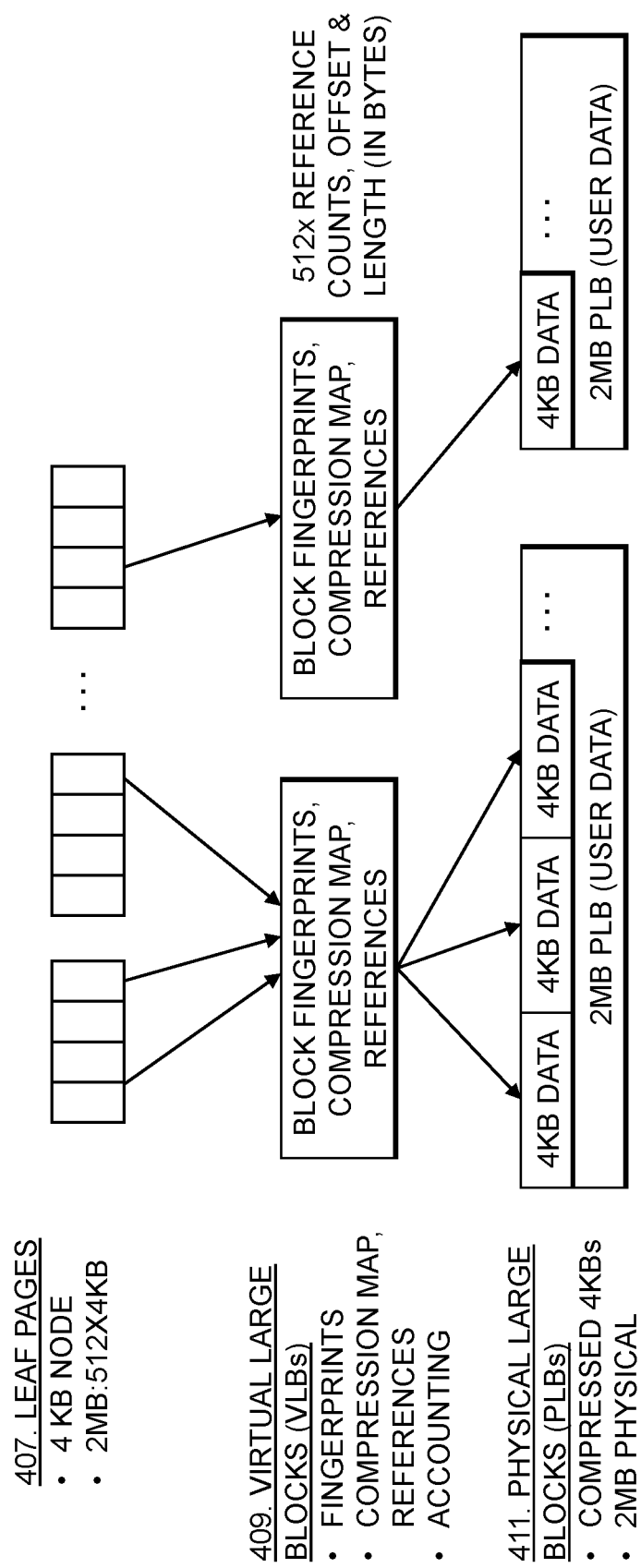

FIGS. 4A and 4B show a tree structure utilized by the mapper module 315 to store data in some embodiments. As noted above, the tree structure may comprise a 512-way B-tree structure, with levels for root pages 401, top pages 403, middle ("mid") pages 405, leaf pages 407, virtual large blocks (VLBs) 409, and physical large blocks (PLBs) 411. As illustrated in FIG. 4A, the root pages 401 provide a logical address space, which in some embodiments ranges from 0 to 8 exabytes (EB). The logical address space, which may be a thin logical address space, includes various inode offsets, two of which are labeled (e.g., inode[0] and inode [N]). Each of the inode offsets for the root pages 401 include a 4 KB node with 512 indirection pointers to respective ones of the top pages 403, each of the top pages 403 also has a 4 KB node with 512 pointers to respective ones of the middle pages 405, and each of the middle pages 405 has a 4 KB node with 512 pointers to respective ones of the leaf pages 407. Each of the leaf pages 407 may represent 2 megabytes (MB), and thus a given one of the middle pages 405 may represent 1 gigabyte (GB) (e.g., 512 of the leaf pages 407×2 MB) and a given one of the top pages 403 may thus represent 512 GB (e.g., 512 of the middle pages 405×1 GB).

As illustrated in FIG. 4B, each of the leaf nodes 407 may include 512 pointers to VLBs 409 each representing 4 KB (e.g., such that a given one of the leaf nodes 407 represents 2 MB as noted above, as 512×4 KB=2 MB). The VLBs 409 include block fingerprints (or hash values), reference counts, compression maps, and accounting information (e.g., offset and length, in bytes (B)) for the PLBs 411. Each of the PLBs 411 provides 2 MB physical space for storing user data (e.g., as a set of 4 KB compressed data blocks).

The mapper module 315 may access the tree structure of FIGS. 4A and 4B using keys, where a key for the root pages 401 level includes a host LBA and inode offset and index, where the index is the key divided by 256 terabytes (TB). At the top pages 403 level, the index is the key modulo 512 GB. At the middle pages 405 level, the index is the key modulo 1 GB. At the leaf pages 407 level, the index is the key modulo 2 MB.

Figure 5A:
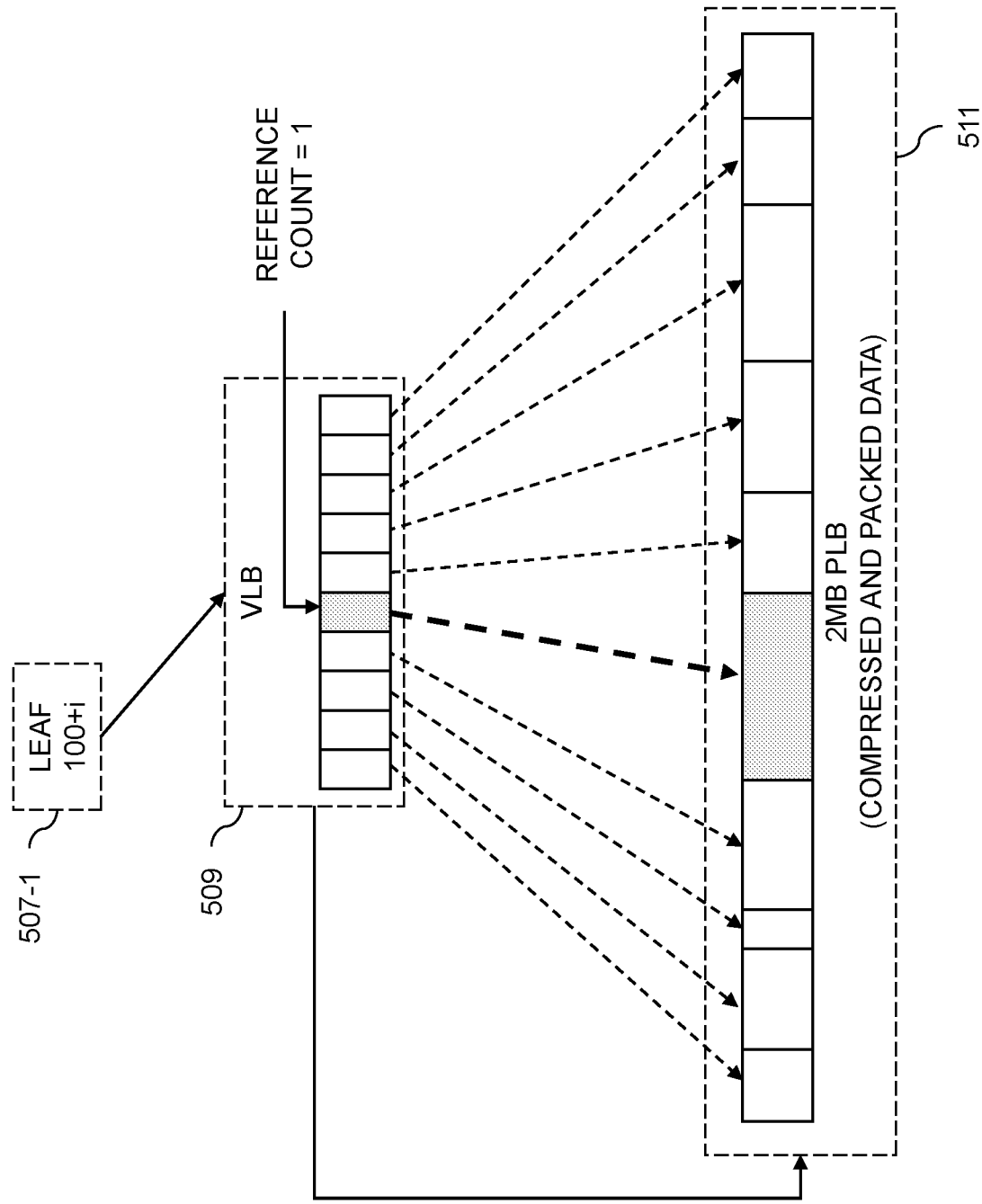
FIGS. 5A and 5B illustrate deduplication using a virtual large block of the tree structure of FIGS. 4A and 4B in an illustrative embodiment.
Figure 5B:
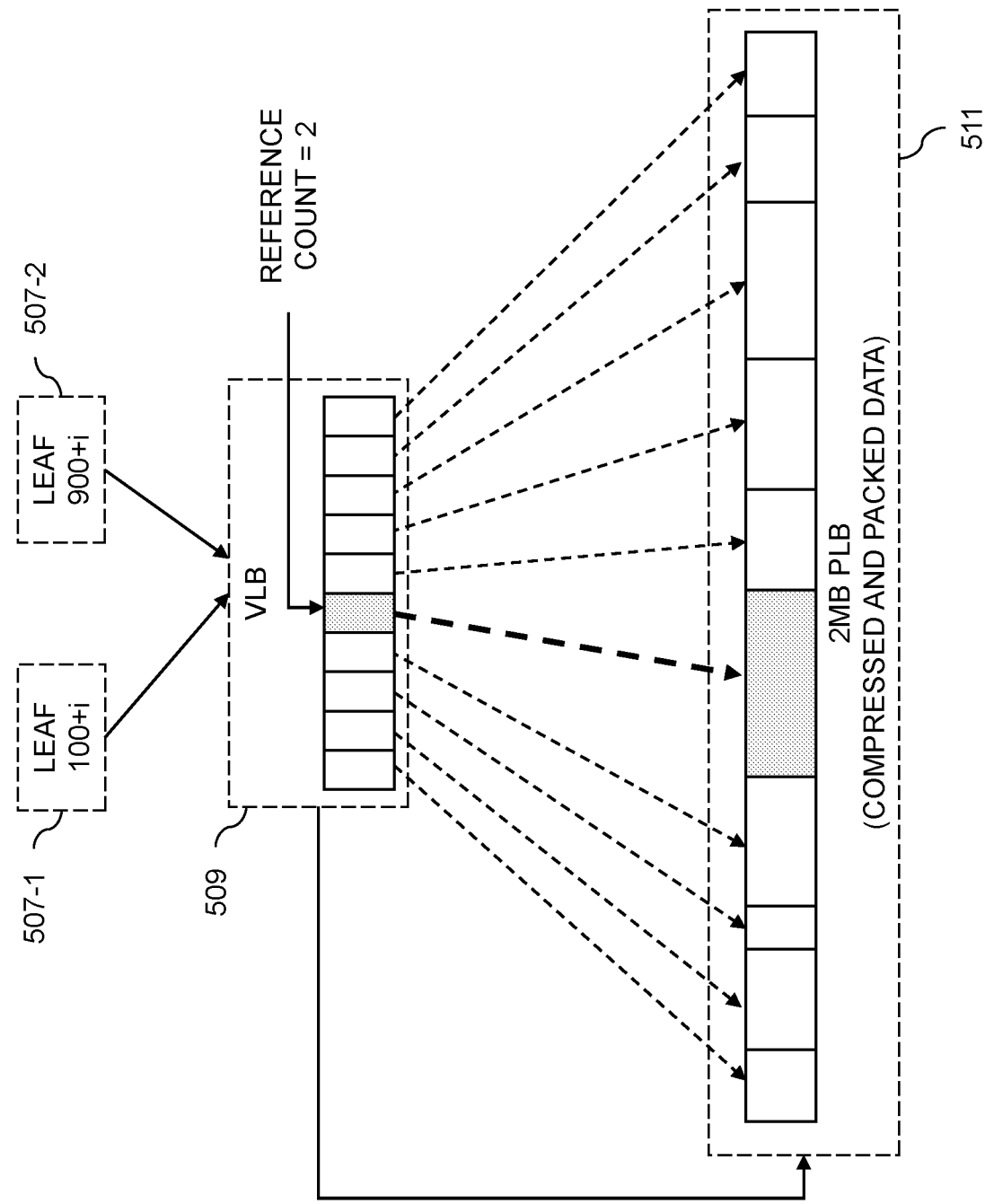

FIGS. 5A and 5B show deduplication using VLBs of the tree structure of FIGS. 4A and 4B. FIGS. 5A and 5B show a given VLB 509 and associated PLB 511 which includes 2 MB of compressed and packed data. The VLB 509 is assumed to contain a block address of the PLB 511, which provides a 2 MB data extent, and an array with 512 virtual entries. The virtual entries of a VLB, such as the 512 entries of VLB 509 in the example of FIGS. 5A and 5B, may be associated with respective virtual block addresses. Each VLB may thus be associated with a VLB extent that comprises a range of virtual block addresses (a VLB extent, in some cases, may include multiple VLBs such that its associated range of virtual block addresses span the multiple VLBs). Such an arrangement will be described in further detail below with respect to FIG. 7.

Each of the 512 virtual entries of the VLB 509 includes a byte offset to where a compressed 4 KB data portion starts in the PLB 511, as well as a byte length of the compressed 4 KB data portion and a reference count (e.g., the number of leaf page references to that compressed 4 KB data portion). In FIG. 5A, one leaf page 507-1 (e.g. leaf 100+i) references a particular compressed 4 KB data portion (e.g., shaded in gray) in the PLB 511. Thus, as shown in FIG. 5A, the reference count in the VLB corresponding to that portion (e.g., also shaded in gray) is 1. FIG. 5B shows that, when another leaf page 507-2 (e.g., leaf 900+i) also references that particular portion in PLB 511, the reference count for that portion in VLB 509 is updated to 2. In this way, two or more leaf pages can reference the same virtual block address. In the example of FIGS. 5A and 5B, deduplication has a granularity of 4 KB (e.g., the size of each compressed data portion in the PLB 511). Some embodiments enable a global deduplication domain, where any of the leaf pages can reference any of the compressed data portions in any of the PLBs. The reference count, however, may limit deduplication to a certain amount (e.g., 256:1).

To implement deduplication, a deduplication "fingerprint" cache, such as the global fingerprint cache 120 of FIG. 1, may be utilized. As noted above, the global fingerprint cache 120 may be implemented as a large K-V store, with N-way associative hashes providing fast, in-memory lookup that enables verification of deduplication with read and compare. Consider a piece of data, denoted $data_1$, that is found in the global fingerprint key-value cache 120. This may include hashing $data_1$, where the hash matches a key in the K-V store corresponding to a given VLB. The given VLB is then fetched to find the page referenced, and the corresponding portion of the associated PLB is read, decompressed and then compared to verify that $data_1$ is a duplicate. Consider another piece of data, denoted $data_2$, that is not found in the global fingerprint cache 120. In this case, a new entry is added to the K-V store (e.g., a new K-V pair). If there is no remaining space, entries may be evicted using any suitable cache replacement algorithm, such as a least recently used (LRU) cache replacement algorithm. The $data_2$ is then stored as a new 4 KB data block in one of the PLBs.

The mapper module 315 may implement log-structured writes for efficient full stripe RAID writes (e.g., where each stripe is 2 MB continuing the example above) to flash memory using mapped RAID 321. Pending writes are flushed from the transaction cache or transaction log cache implemented by transaction and log caching module 317. Patterns and duplications are subtracted, then the data is compressed and packed into a stripe. The full stripe is then written and mapped to the thin address space.

FIG. 6 illustrates (i) a block-based tracker 600 of hash values stored in the buffer cache 130 of FIG. 1 for each PLB stored in the buffer cache 130 of FIG. 1; and (ii) a block-based tracker 650 of common hash values among the hash values stored for $PLB_i$ and $PLB_j$ that are cached in the buffer cache 130, according to one illustrative embodiment. As shown in FIG. 6, for each PLB stored in the buffer cache 130, the block-based tracker 600 marks each block with an "x" when the hash value for the respective block is found in the global fingerprint cache 120 (e.g., to track the spatial co-locality). In addition, for each PLB stored in the buffer cache 130, the block-based tracker 600 maintains a counter, $G_i$, indicating a number of blocks within $PLB_i$ where the hash value for the respective block is found in the global fingerprint cache 120.

As further shown in FIG. 6, for each pair of PLBs stored in the buffer cache 130, the block-based tracker 650 marks each block with a "y" when a given pair of PLBs, $PLB_i$ and $PLB_j$, that are cached in the buffer cache 130 at a given time share common hash values (e.g., have a substantially duplicate fingerprint) among the hash values stored for physical blocks of the given pair, $PLB_i$ and $PLB_j$ (e.g., to track the temporal co-locality). In addition, for each pair of PLBs, $PLB_i$ and $PLB_j$, stored in the buffer cache 130, the block-based tracker 650 maintains a counter, $T_{ij}$, indicating the number of physical blocks of the PLB pair having substantially duplicate fingerprints, based on one or more duplicate fingerprint criteria, among the two PLBs.

In addition, as shown in FIG. 6, a ratio, $S_{ij}=T_{ij}/G_j$, is maintained for each pair of PLBs, $PLB_i$ and $PLB_j$. In one exemplary variation, the $S_{ij}$ ratio can be normalized using a maximum value of $G_i$ and $G_j$, instead of $G_j$. As discussed further below, a pairwise comparison of the ratios for the two entries is performed in some embodiments to sort the entries in the buffer cache 130. One or more entries from the sorted buffer cache 130 can be evicted from the cache using an eviction policy, such as those entries that do not satisfy a predefined threshold (or a top N requirement). For example, a threshold, NB (or p %) can be defined as a number of PLBs that will be evicted. The threshold can be based, for example, on a size of the buffer cache 130 and/or a count of the number of available processing cores to process the cache flushing and eviction processes (as discussed further below in conjunction with FIGS. 7A, 7B and 8). In some embodiments, the threshold can be updated at each execution according to the prior execution.

Generally, one or more aspects of the disclosure recognize that there is a higher probability that the remaining data blocks will be used for a byte compare (from the blocks in the buffer cache 130) for deduplication and they will not need to be obtained from the backend storage.

FIGS. 7A and 7B, collectively, illustrate exemplary pseudo code for a process 700 for maintaining the buffer cache of FIG. 1 in at least some illustrative embodiments. Generally, the exemplary process 700 maintains PLBs in the buffer cache 130 longer based on temporal co-locality. The spatial co-locality employed by process 700 is only for PLBs in the buffer cache 130 (without considering pages that are no longer in the buffer cache 130 and must be read from the backend storage).

In the embodiment of FIG. 7A, the process 700 processes the PLBs in the buffer cache 130 at time t(k) and the hash values in the global fingerprint cache 120. The process 700 generates a sorted list of PLBs in the buffer cache 130 (following a sorting and eviction of certain PLBs). After some initializing steps during steps 0 through 4, that orders the blocks in each PLB using the LBA to ensure spatial block proximity in the PLBs, a loop is entered at steps 5 through 11 to process each PLB, to compute a hash value (step 7), determine whether the computed hash value is already in the global fingerprint cache 120 (step 8) and determine the value of the counter, $G_i$ (step 9).

As further shown in FIG. 7A, a loop is entered at steps 12 through 16 to process each PLB pair, $PLB_i$ and $PLB_j$, to determine the value of the counter, $T_{ij}$, indicating the number of duplicate blocks between each pair of PLBs and the ratio, $S_{ij}=T_{ij}/G_j$, for each pair of PLBs, $PLB_i$ and $PLB_j$. A pairwise sorting of the PLB pair, $PLB_i$ and $PLB_j$, is performed in some embodiments by the loop performed during steps 17 through 22 (FIG. 7B), for example, using a bubble sorting technique. Thus, the PLBs in the buffer cache 130 will be ordered by the ratio, $S_{ij}$, such that the PLBs in the buffer cache 130 are ordered by temporal co-locality in the buffer cache 130 and by spatial order of LBA within each PLB. During step 27, PLBs with an index, i, below a threshold, W, are evicted from the buffer cache 130, and the remaining PLBs are stored back into the buffer cache 130 during step 29.

FIG. 8 illustrates exemplary pseudo code for an alternate process 800 for maintaining the buffer cache of FIG. 1 in at least some illustrative embodiments. Generally, the exemplary process 800 maintains PLBs in the buffer cache 130 longer based on temporal co-locality and the spatial co-locality is for PLBs in the buffer cache 130 after the flush and eviction, as well as PLBs obtained into the buffer cache 130 from the backend storage for the byte comparison portion of the deduplication. It is noted that in some embodiments, the process 800 can be performed in parallel with, or independently of, the process 700 of FIGS. 7A and 7B.

Thus, the process 800 sorts (e.g., reorders) the PLBs in the buffer cache 130 including PLBs that were kept in the buffer cache 130 after being flushed (e.g., the surviving 20% of PLBs) and PLBs loaded from the backend storage to the buffer cache 130 for a byte comparison of individual data blocks for deduplication that have hash values in the global fingerprint cache 120.

In the example of FIG. 8, the process 800 employs a forgetting factor to sort "old" PLBs in the buffer cache 130 and replace them with PLBs previously stored on disk and reloaded into the buffer cache 130. In this manner, an additional refresh is performed of the content of the buffer cache 130 with PLBs from disk. As a result, there is a higher probability of finding data blocks in the buffer cache 130 and avoid going to the disk to perform a byte comparison of new data blocks. One or more aspects of the disclosure recognize that loading PLBs into the buffer cache 130 for a byte comparison brings the entire PLB (rather than the individual data blocks of the PLB needed to perform the byte comparison).

The process 800 uses the ratio $S_{ij}$ as a weight that is selected such that PLBs with higher values of the counter $G_i$ are given a weight U, and PLBs with lower values of the counter $G_i$ (between $PLB_i$ and $PLB_j$) are given a weight of (1−U), where U equals $S_{ij}/S_{ij+1}$ for the PLBs pairs in the buffer cache 130 at time T(k), as shown in step 20'. If the weighted function of $PLB_i$ is lower than the weighted function of $PLB_{i+1}$, the order of $PLB_i$ and $PLB_{i+1}$ are switched in lines 24 to 26. In the example of FIG. 8, the weighted "similarity" function of $PLB_i$ and $PLB_{i+1}$ can be calculated in steps 21' and 22', as follows:

$$SF_i = (1-\mu)*G_i + \mu*S_{ij}, \text{ and}$$

$$SF_{i+1} = (1-\mu)*G_{i+1} + \mu*S_{ij+1},$$

where:

$G_i$ is the number of blocks with hash values in the global fingerprint cache 120 for $PLB_i$; $T_{ij}$ is the number of blocks that are common between cached PLBs; and $S_{ij}$ and $S_{ij+1}$ are the ratios of the number of blocks with hash values in the global fingerprint cache 120 and the number of shared blocks between PLB pairs. If $SF_i$ is less than $SF_{i+1}$ then the positions of $PLB_i$ and $PLB_{i+1}$ are switched in the buffer cache 130.

During steps 28' through 31', for each PLB pair, the process 800 PLBs that have been cached in the buffer cache 130 for too long to be replaced by new PLBs from the backend storage (e.g., from disk) by replacing the ratio $S_{ij}$ with the similarity function $SF_i$. In this manner, the number of times that data blocks will need to be read from the backend storage to perform a byte compare for the deduplication process will be reduced.

While the spatial co-locality in the example of FIG. 8 refers to a global spatial co-locality where PLBs brought into the buffer cache for purposes of the byte comparison of hash values are resident in the global fingerprint cache 120, it is noted that blocks having "close" LBAs could be also considered to be locally spatially co-located, as the LBA sorting is automatically performed by sorting the blocks by LBA and grouping them into PLBs (e.g., FIG. 7A, step 2).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for performing cache retention for inline deduplication based on a number of physical blocks with common fingerprints among multiple cache entries will now be described in greater detail with reference to FIGS. 9 and 10. Although described in the context of system 100, these platforms may also be used to implement at least portions of other information processing systems in other embodiments.

Figure 9:
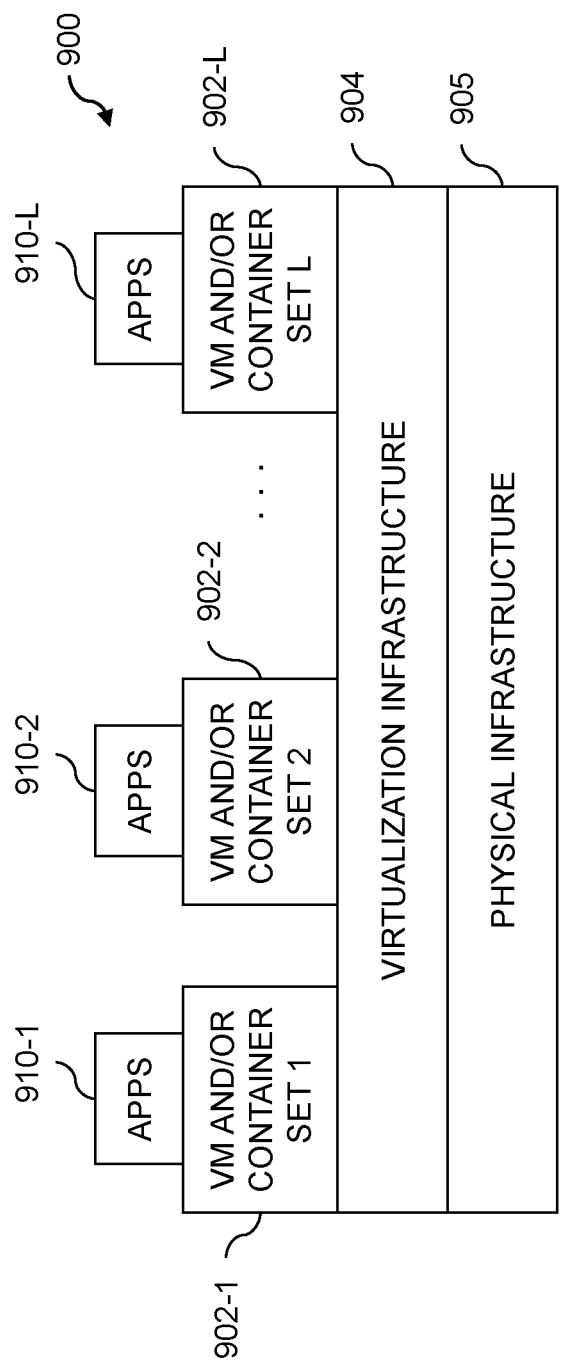
FIGS. 9 and 10 show examples of processing platforms that may be utilized to implement at least a portion of an information processing system in illustrative embodiments.
Figure 10:
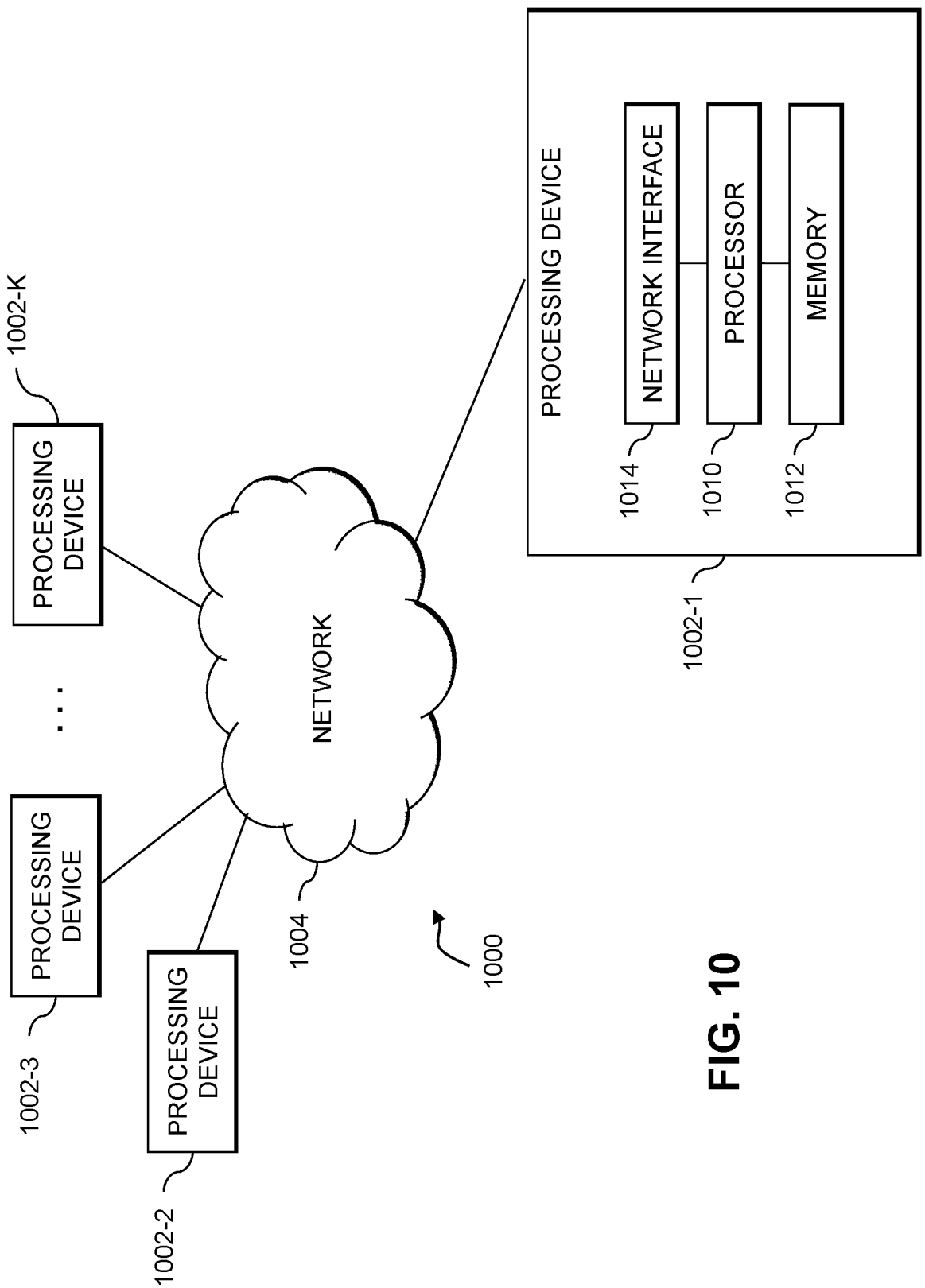

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for maintaining a cache for inline deduplication based on a number of physical blocks with common fingerprints among multiple cache entries as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage devices, tree structures, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

storing input/output operations in a first cache associated with a storage system, wherein the first cache comprises a plurality of entries, wherein each entry in the first cache corresponds to a physical storage entity comprising a plurality of physical blocks; and maintaining a given entry in the first cache based at least in part on a first number of physical blocks of the given entry having a substantially duplicate fingerprint, using one or more duplicate fingerprint criteria, with a fingerprint of at least one physical block of another entry in the first cache, wherein the method is performed by at least one processing device comprising a processor coupled to a memory.

2. The method of claim 1, wherein a fingerprint of a given physical block comprises a hash function applied to data associated with the given physical block.

3. The method of claim 1, wherein the maintaining further comprises determining a second number of the physical blocks of each entry in the first cache having a fingerprint in a second cache.

4. The method of claim 3, further comprising determining a first ratio for two entries in the first cache based at least in part on the second number and the first number.

5. The method of claim 4, further comprising sorting the entries in the first cache based at least in part on the first ratios for the entries.

6. The method of claim 5, further comprising evicting one or more entries from the sorted first cache using an eviction policy.

7. The method of claim 5, further comprising determining a similarity function for a given pair of entries based at least in part on a first weight assigned to a first one of the given pair of entries and a second weight assigned to a second one of the given pair of entries, wherein the first weight and the second weight are assigned based at least in part on a comparison of the second number of each of the given pair of entries, wherein the first weight is determined based at least in part on a second ratio of the first ratio of the first one of the given pair of entries and the first ratio of the second one of the given pair of entries.

8. The method of claim 7, further comprising updating the first ratio for a given one of the two entries using a value of the similarity function for one or more of the given pair of entries.

9. The method of claim 1, wherein the storage system comprises a logical address space comprising pointers to entries in a plurality of virtual blocks in a virtual block level of the logical address space, wherein the virtual blocks comprise pointers to entries in a plurality of physical blocks in a physical block level of the logical address space.

10. An apparatus comprising:

at least one processing device comprising a processor coupled to a memory;

the at least one processing device being configured to implement the following steps:

storing input/output operations in a first cache associated with a storage system, wherein the first cache comprises a plurality of entries, wherein each entry in the first cache corresponds to a physical storage entity comprising a plurality of physical blocks; and maintaining a given entry in the first cache based at least in part on a first number of physical blocks of the given entry having a substantially duplicate fingerprint, using one or more duplicate fingerprint criteria, with a fingerprint of at least one physical block of another entry in the first cache.

11. The apparatus of claim 10, wherein the maintaining further comprises determining a second number of the physical blocks of each entry in the first cache having a fingerprint in a second cache.

12. The apparatus of claim 11, further comprising determining a first ratio for two entries in the first cache based at least in part on the second number and the first number.

13. The apparatus of claim 12, further comprising sorting the entries in the first cache based at least in part on the first ratios for the entries.

14. The apparatus of claim 13, further comprising evicting one or more entries from the sorted first cache using an eviction policy.

15. The apparatus of claim 13, further comprising determining a similarity function for a given pair of entries based at least in part on a first weight assigned to a first one of the given pair of entries and a second weight assigned to a second one of the given pair of entries, wherein the first weight and the second weight are assigned based at least in part on a comparison of the second number of each of the given pair of entries, wherein the first weight is determined based at least in part on a second ratio of the first ratio of the first one of the given pair of entries and the first ratio of the second one of the given pair of entries; and updating the first ratio for a given one of the two entries using a value of the similarity function for one or more of the given pair of entries.

16. A non-transitory processor-readable storage medium having stored therein program code of one or more software programs, wherein the program code when executed by at least one processing device causes the at least one processing device to perform the following steps:

storing input/output operations in a first cache associated with a storage system, wherein the first cache comprises a plurality of entries, wherein each entry in the first cache corresponds to a physical storage entity comprising a plurality of physical blocks; and maintaining a given entry in the first cache based at least in part on a first number of physical blocks of the given entry having a substantially duplicate fingerprint, using one or more duplicate fingerprint criteria, with a fingerprint of at least one physical block of another entry in the first cache.

17. The non-transitory processor-readable storage medium of claim 16, wherein the maintaining further comprises determining a second number of the physical blocks of each entry in the first cache having a fingerprint in a second cache.

18. The non-transitory processor-readable storage medium of claim 17, further comprising determining a first ratio for two entries in the first cache based at least in part on the second number and the first number.

19. The non-transitory processor-readable storage medium of claim 18, further comprising sorting the entries in the first cache based at least in part on the first ratios for the entries and evicting one or more entries from the sorted first cache using an eviction policy.

20. The non-transitory processor-readable storage medium of claim 19, further comprising determining a similarity function for a given pair of entries based at least in part on a first weight assigned to a first one of the given pair of entries and a second weight assigned to a second one of the given pair of entries, wherein the first weight and the second weight are assigned based at least in part on a comparison of the second number of each of the given pair of entries, wherein the first weight is determined based at least in part on a second ratio of the first ratio of the first one of the given pair of entries and the first ratio of the second one of the given pair of entries; and updating the first ratio for a given one of the two entries using a value of the similarity function for one or more of the given pair of entries.

* * * * *